(12) United States Patent
Hackett et al.

(10) Patent No.: US 8,833,344 B2
(45) Date of Patent: Sep. 16, 2014

(54) DUAL FUEL INJECTOR FEED USING DIFFERENTIAL LENGTH QUILLS

(75) Inventors: David Elliot Hackett, Washington, IL (US); Mark F. Sommars, Hopewell, IL (US)

(73) Assignee: Caterpillar Inc., Peoria, IL (US)

( * ) Notice: Subject to any disclaimer, the term of this patent is extended or adjusted under 35 U.S.C. 154(b) by 428 days.

(21) Appl. No.: 13/106,504

(22) Filed: May 12, 2011

(65) Prior Publication Data

US 2012/0285419 A1   Nov. 15, 2012

(51) Int. Cl.
*F02M 1/00* (2006.01)
*F02M 43/00* (2006.01)

(52) U.S. Cl.
USPC .................. 123/468; 285/123.1; 123/469

(58) Field of Classification Search
USPC ............. 123/304, 456, 468–470, 514, 198 D; 285/123.1, 123.2, 123.3, 123.15, 285/120.1, 124.1
See application file for complete search history.

(56) References Cited

U.S. PATENT DOCUMENTS

| | | | | |
|---|---|---|---|---|
| 2,683,961 A | * | 7/1954 | Britton et al. ................ 60/208 |
| 3,845,748 A | * | 11/1974 | Eisenberg ..................... 123/468 |
| 5,239,964 A | * | 8/1993 | Diener et al. ................. 123/456 |
| 5,365,907 A | * | 11/1994 | Dietrich et al. .............. 123/470 |
| 5,617,828 A | * | 4/1997 | Kuegel et al. ................ 123/468 |
| 6,076,356 A | * | 6/2000 | Pelletier ........................ 60/740 |
| 6,279,540 B1 | * | 8/2001 | Greaney et al. .............. 123/470 |
| 6,431,150 B1 | * | 8/2002 | Pearlman et al. ............ 123/468 |
| 6,827,065 B2 | * | 12/2004 | Gottemoller et al. ........ 123/456 |
| 8,272,368 B2 | * | 9/2012 | Wickstone .................... 123/468 |
| 2007/0241560 A1 | * | 10/2007 | Malone ......................... 285/319 |

FOREIGN PATENT DOCUMENTS

CA   2 635 410   10/2009

\* cited by examiner

*Primary Examiner* — John Kwon
*Assistant Examiner* — Johnny H Hoang
(74) *Attorney, Agent, or Firm* — Miller, Matthias & Hull

(57) ABSTRACT

A duel fuel quill assembly and method for assembling such an assembly for an engine are disclosed. The dual fuel quill assembly may comprise a cylinder head including a main bore and a receiving cavity, an outer quill tube, an inner quill tube nested within the outer quill tube, an adapter slidingly received inside the main bore of the cylinder head, and a manifold secured to the adapter. The adapter may be moveable between a first position and a second position and may define an axial bore configured to receive the outer quill tube and the nested inner quill tube. The manifold may define a recess configured to compress the outer and inner quill tubes against the cylinder head cavity when the adapter is in the second position.

20 Claims, 8 Drawing Sheets

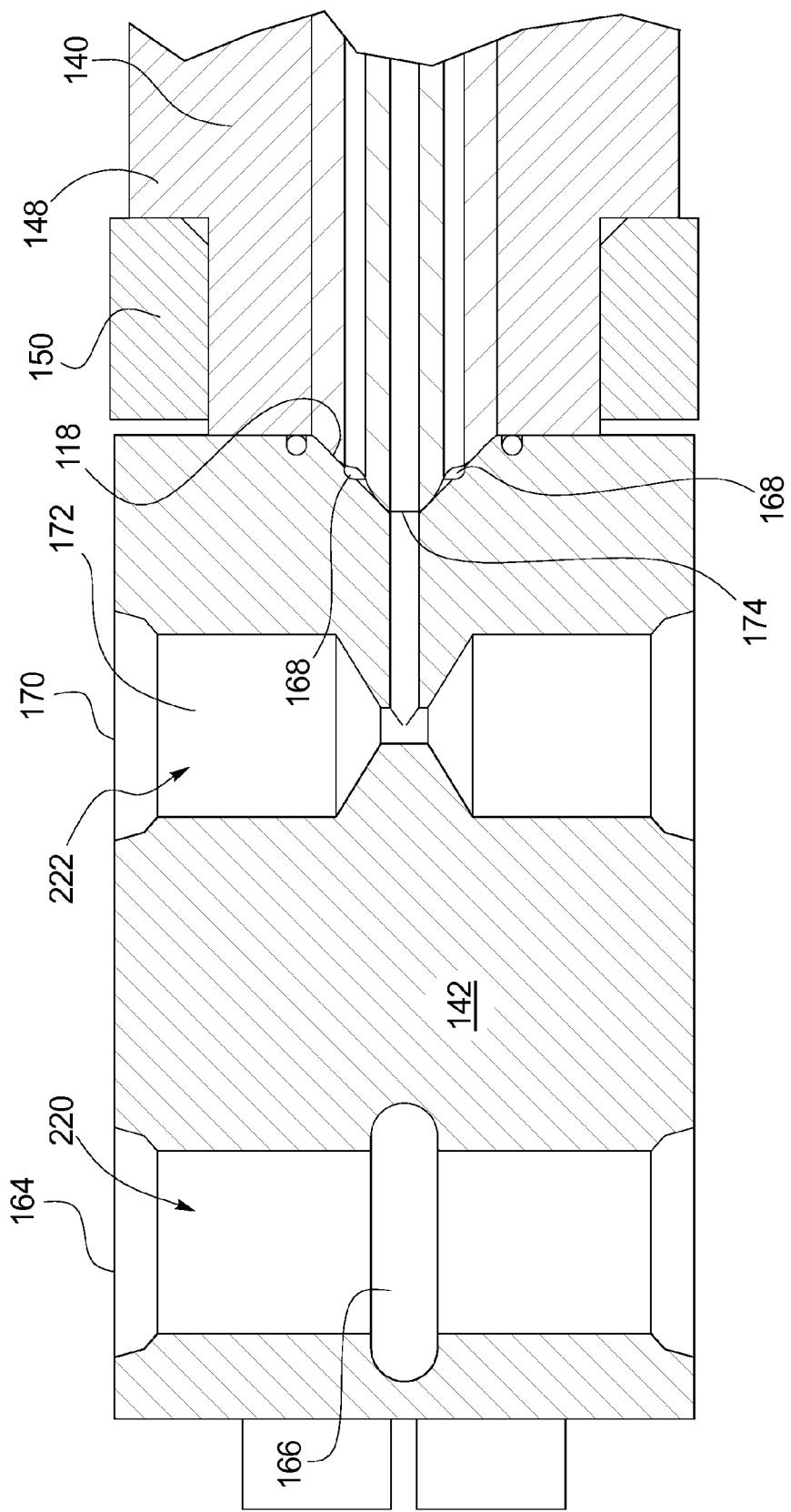

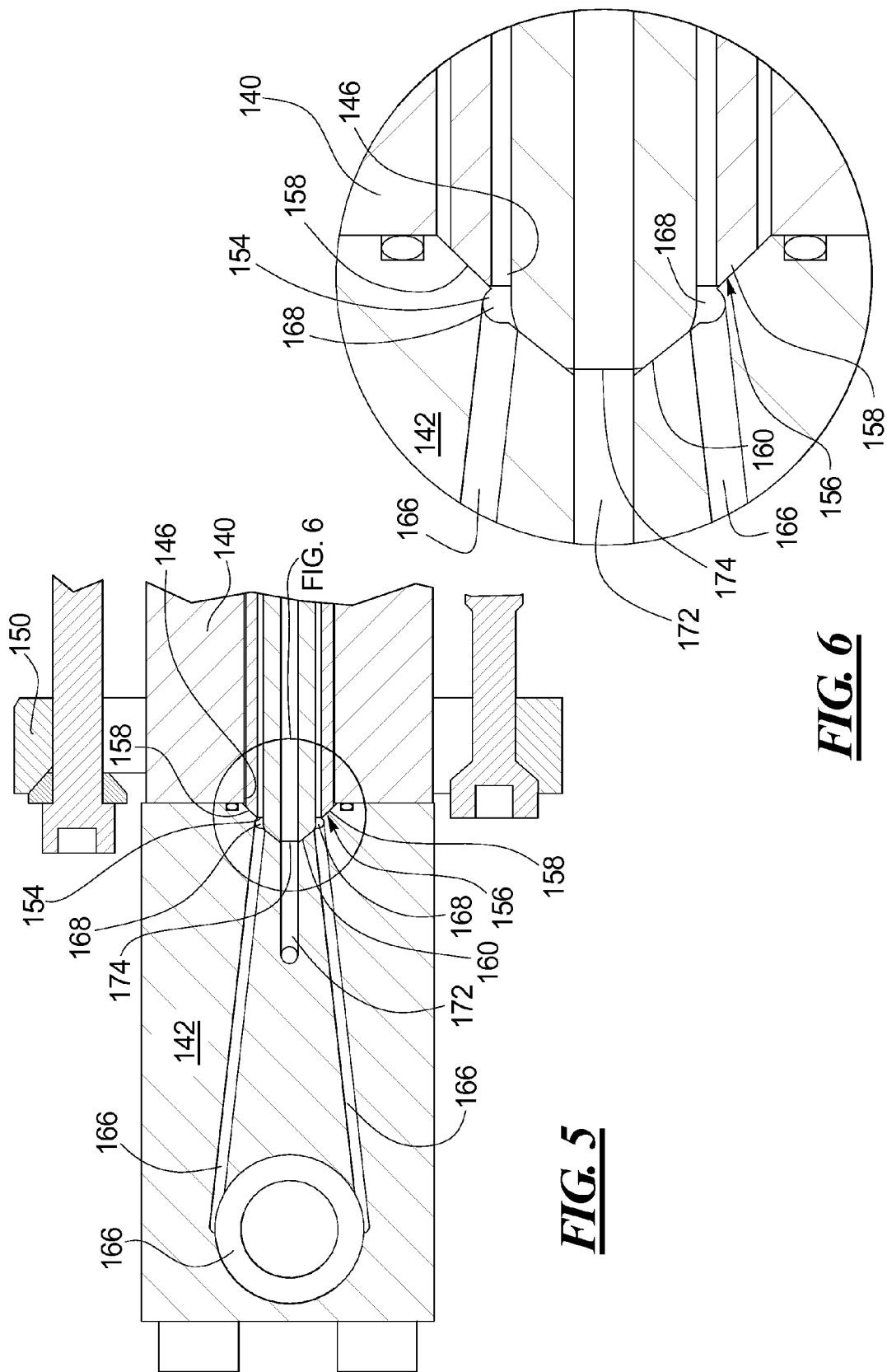

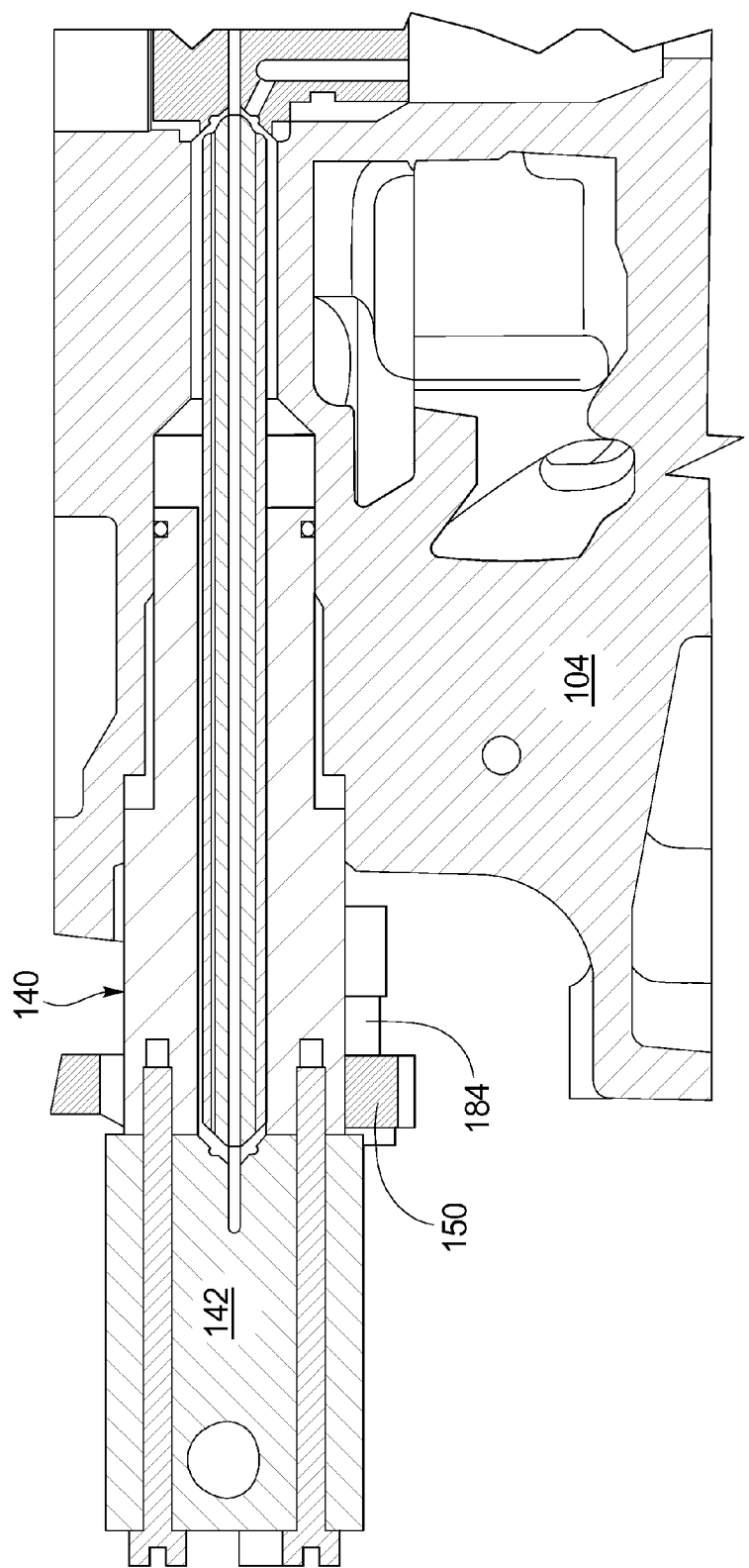

DUAL FUEL INJECTOR FEED USING DIFFERENTIAL LENGTH QUILLS

TECHNICAL FIELD

The present disclosure generally relates to injector feeds for engines and, more particularly, relates to a dual fuel quill assembly for use with dual fuel engines used in earth moving and mining vehicles, on highway trucks, standalone engines for power generation, and the like.

BACKGROUND

Diesel engines are used in a wide variety of industrial applications. These engines are known as compression ignition engines because they are internal combustion engines that utilize the heat of compression to ignite the diesel fuel in the combustion chamber of the engine.

Many industrial applications where diesel engines are used would benefit environmentally and economically from use of natural gas as the engine fuel. Natural gas is generally readily available, tends to be more economical and produces less undesirable emissions when burned. Furthermore, engines burning natural gas generally have fewer maintenance problems. However, the ignition of natural gas in compression ignition engines is difficult because natural gas has a much higher temperature for auto ignition than diesel fuel. To resolve this problem a small amount of pilot fuel, such as diesel fuel, may be used to initiate ignition of the primary fuel, natural gas, in the combustion chamber of the engine. Such duel fuel engines require a duel fuel quill assembly injector feed that carries both the primary fuel and the pilot fuel to the engine. Because of the relative quantities and properties of the primary fuel and the pilot fuel, a duel fuel quill assembly injector feed must be used that can effectively provide the required sealing contact force at various junctures within the feed so that fuel leakage is minimized. In such engines a relatively small amount of pilot fuel is required and, as such, the quill tubes (of the duel fuel quill assembly) that carry the pilot fuel may be relatively smaller in diameter than the quill tubes the carry the primary fuel. Because of the size of the tubes and the properties of the fuels, typically a much higher pressure is required to seal flowpath junctures in a duel fuel quill assembly injector feed for the quill tubes carrying the primary fuel than for the quill tubes carrying the pilot fuel.

Canadian Patent 2,635,410 teaches a dual fuel connector that relies upon a single quill that includes two different internal passages to facilitate fluid connection to two different fuel inlets of a fuel injector. This type of dual fuel connector has drawbacks because, at a minimum, the reference fails to teach an effective strategy for inhibiting fuel leakage.

A design is needed for a duel fuel quill assembly that effectively seals the flowpaths for each fuel at the various junctures in the quill assembly over which each fuel must flow.

SUMMARY OF THE DISCLOSURE

In accordance with one aspect of the disclosure, a dual fluid quill assembly is disclosed. The dual fluid quill assembly may comprise a first quill tube of a first length, a second quill tube of a second length, an adapter defining an axial bore configured to receive the first quill tube and the second quill tube, and a manifold adjacent to the adapter. The second quill tube may be nested within the first quill tube and the second length (of the second quill tube) may be different than the first length (of the first quill tube). The manifold may include a sealing surface sealingly engaged with a first end of the first quill tube and a first end of the second quill tube. The sealing surface may be configured to apply a first sealing contact force to the first end of the first quill tube and a second sealing contact force to a first end of the second quill tube.

In accordance with another aspect of the disclosure, a dual fuel quill assembly for an engine is disclosed. The dual fuel quill assembly may comprise a cylinder head including a main bore and a receiving cavity, an outer quill tube of a first length, an inner quill tube nested within the outer quill tube and having a second length that is different than the first length, an adapter slidingly received inside the main bore of the cylinder head, the adapter moveable between a first position and a second position and defining an axial bore configured to receive the outer quill tube and the nested inner quill tube, and a manifold secured to the adapter, the manifold defining a recess configured to compress the outer and inner quill tubes against the cylinder head cavity when the adapter is in the second position.

In accordance with a further aspect of the disclosure, a method of assembling a dual fuel quill assembly for an engine is disclosed. The method may comprise providing an outer quill tube having a first spring rate and a first length, an inner quill tube having a second spring rate and a second length, an adapter defining an axial bore, a manifold attached to the adapter and defining a recess, and a cylinder head defining a main bore. The inner quill tube may be nested in the outer quill tube. The method may further comprise positioning the outer and inner quill tubes in the main bore of the cylinder head, sliding the outer and inner quill tubes into the adapter axial bore, generating a first recess sealing contact force between the recess and the outer quill tube when the adapter is secured to the cylinder head, and generating a second recess sealing contact force between the recess and the inner quill tube when the adapter is secured to the cylinder head. The first recess sealing contact force generated may be different than the second recess sealing contact force generated.

BRIEF DESCRIPTION OF THE DRAWINGS

FIG. 4 is a cross-sectional view of the exemplary dual fuel quill assembly of FIG. 2 taken along lines 4-4;

FIG. 5 is a cross-sectional view of the exemplary dual fuel quill assembly of FIG. 2 taken along lines 5-5;

FIG. 6 is an enlarged detail view of the first ends of the inner and outer quill tubes and the sealing surfaces of the manifold recess of FIG. 5;

FIG. 7 is a cross-sectional view of an exemplary dual fuel quill assembly with the first member in the open position;

DETAILED DESCRIPTION

Figure 1:
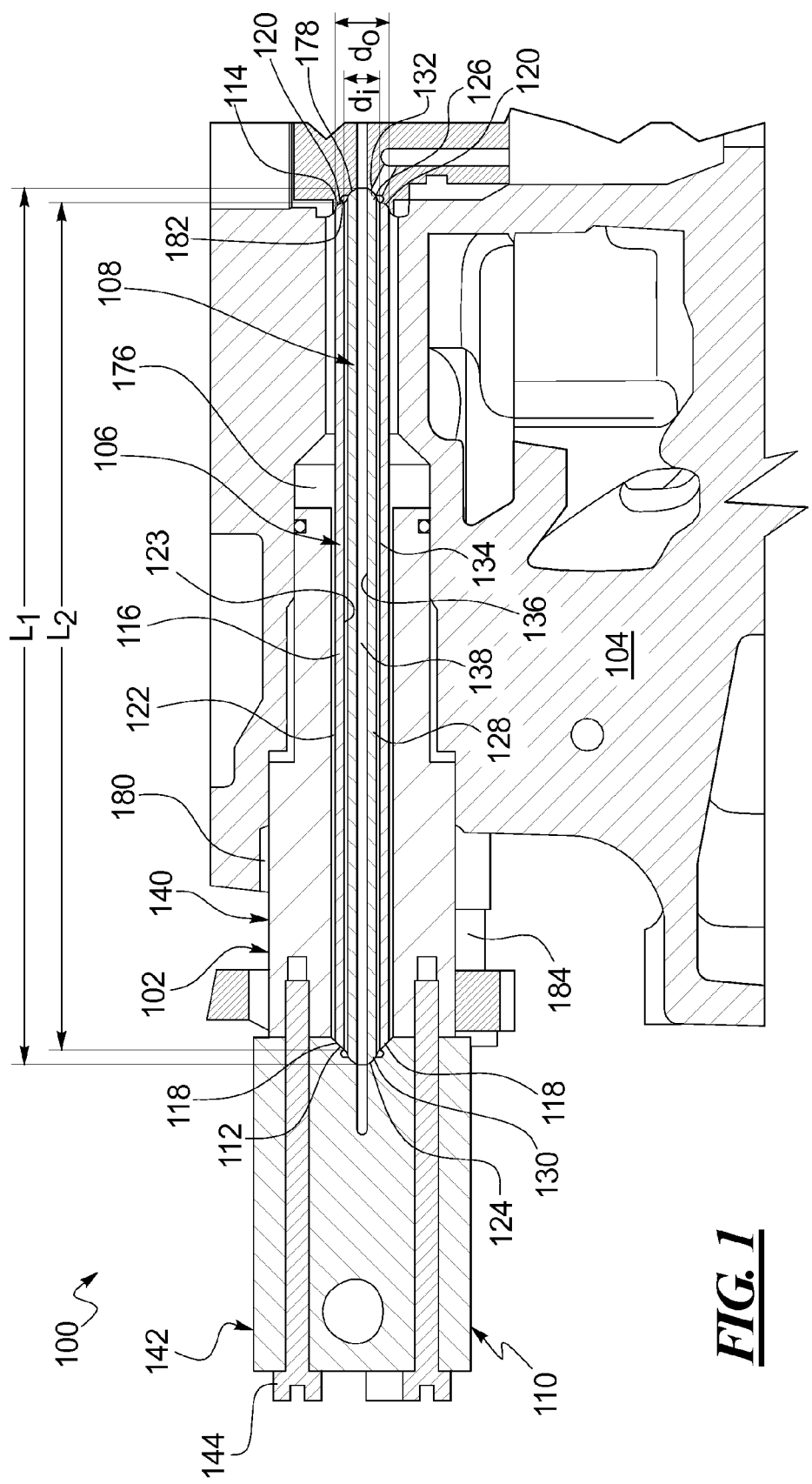
FIG. 1 is a cross-sectional view of the exemplary dual fuel quill assembly of FIG. 2 taken long lines 1-1 and with the first member in the closed position.
Figure 2:
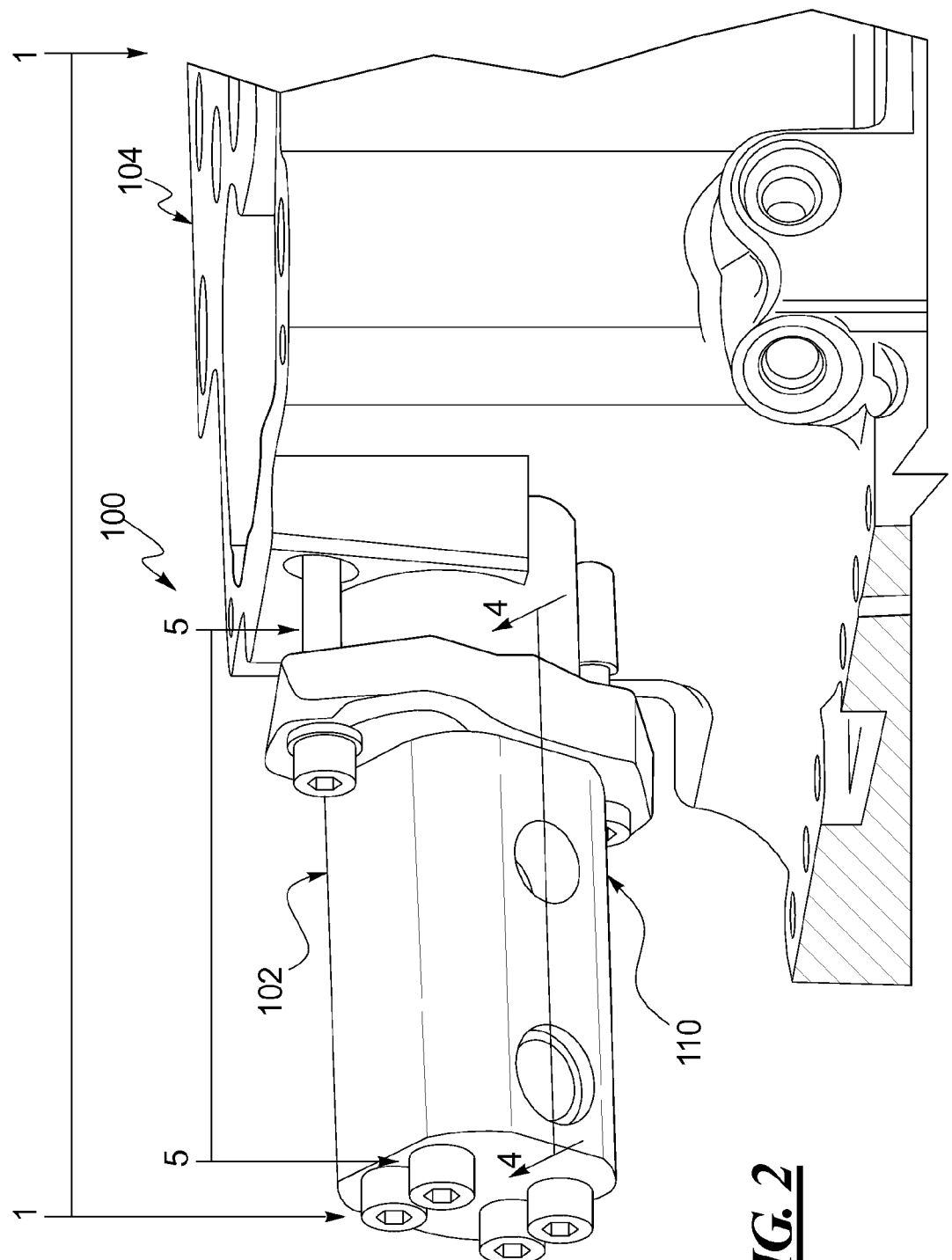
FIG. 2 is perspective view of an exemplary dual fuel quill assembly constructed in accordance with the teachings of this disclosure.

Referring now to the drawings, and with specific reference to FIG. 1, there is shown a cross-sectional view of a dual fuel quill assembly constructed in accordance with the present disclosure and generally referred to by reference numeral 100. The dual fuel quill assembly 100 may comprise a dual quill feed 102 and a cylinder head 104 of an engine (not shown). FIG. 2 illustrates a perspective view of the exemplary dual quill feed 102 mounted on the cylinder head 104 of the engine.

Herein, for the purposes of illustrating the teachings of the disclosure, the term "fuel" means any liquid or gaseous fluid that may be combusted in a compression ignition engine. Such fuels may include, but are not limited to, natural gas, diesel, and the like.

Figure 3:
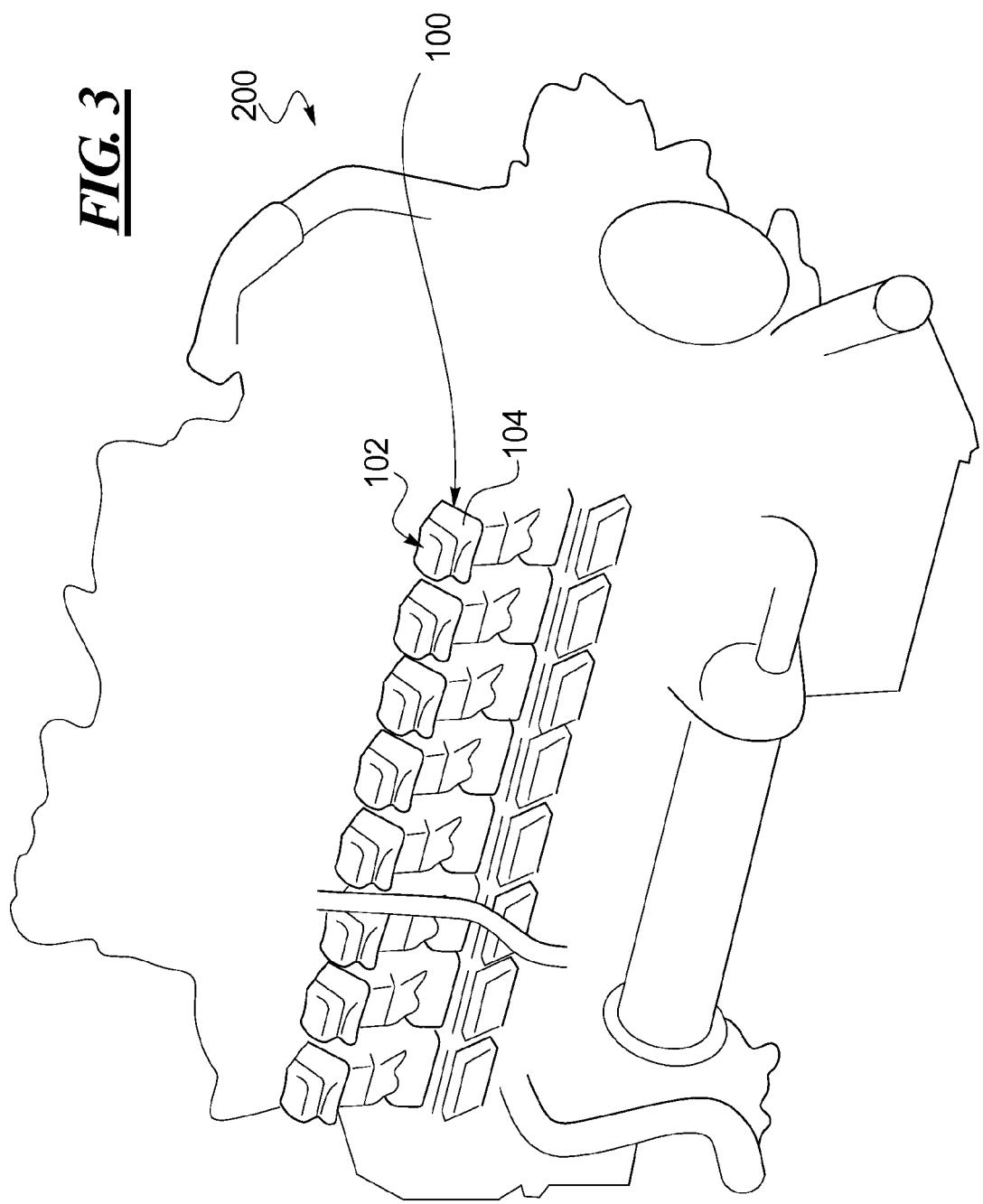
FIG. 3 is perspective view of an exemplary compression ignition engine on which the dual fuel quill assembly of FIG. 1 may be mounted.

While the following detailed description and drawings are made with reference to a dual fuel quill assembly 100 for an engine used in a mining or construction vehicle, the teachings of this disclosure may be employed on other types of vehicles or in standalone engines used in various power generation applications. FIG. 3 illustrates one example of an engine 200 that incorporates the features of the present disclosure. As can be seen in FIG. 3, the dual quill feed 102 is secured to the cylinder head 104 that is mounted on the engine 200.

Turning now to FIGS. 1-2, the dual quill feed 102 comprises an outer quill tube 106 of a first length $L_1$, an inner quill tube 108 of a second length $L_2$ nested in the outer quill tube 106, and a first member 110. The outer and inner quill tubes 106, 108 may be of different lengths L. In one embodiment, the inner quill tube 108 may be longer than the outer quill tube 106. For example, in one embodiment, the difference in length between the outer quill tube 106 and a longer inner quill tube 108 may be in the range of about 0.202 to about 0.302 millimeters and each end of the inner quill tube 108 may protrude about 0.101 millimeters to about 0.151 millimeters from the ends of the outer quill tube 106. In other embodiments, other ranges are possible for both the difference in length and the protrusion one of the quill tubes over the other. In other embodiments, the outer quill tube 106 may be longer than or the same length as the inner quill tube 108.

The outer quill tube 106 includes a first end 112, a second end 114 and an outer tube wall 116 extending between the first and second ends 112, 114. The outer tube wall 116 may have a first outer sealing surface 118 disposed at the first end 112 and a second outer sealing surface 120 disposed at the second end 114. The outer tube wall 116 may be generally cylindrical in shape and may be generally of uniform thickness, excluding the first and second outer sealing surfaces 118, 120. In yet other embodiments, the thickness of the outer tube wall 116 may vary. In some embodiments, the exterior surface 122 of the outer tube wall 116 may be substantially uniform and substantially without shoulders or projections. The first and second outer sealing surfaces 118, 120 may, in some embodiments, generally taper or generally form an arc. Other shapes are possible as well for the outer sealing surfaces 118, 120.

Similarly, the inner quill tube 108 is comprised of a first end 124, a second end 126 and an inner tube wall 128 extending between the first and second ends 124, 126. The inner tube wall 128 may have a first inner sealing surface 130 disposed at the first end 124 and a second inner sealing surface 132 disposed at the second end 126. The inner tube wall 128 may be generally cylindrical in shape and may be generally of uniform thickness, excluding the first and second ends 124, 126. In other embodiments, the thickness of the inner tube wall 128 may vary. The inner tube wall 128 has an exterior 134 and an interior surface 136. The first and second inner sealing surfaces 130, 132 may, in some embodiments, generally taper or generally form an arc. Other geometries are possible as well. The inner quill tube defines an inner fluid passageway 138.

The outer quill tube 106 has a first spring rate $S_1$ and the inner quill tube 108 has a second spring rate $S_2$. The first spring rate $S_1$ may be different than the second spring rate $S_2$ or the first spring rate $S_1$ may be the same as the second spring rate $S_2$. For example, the first spring rate $S_1$ may be greater than the second spring rate $S_2$. In another embodiment, the second spring rate $S_2$ may be greater than the first spring rate $S_1$. In yet another embodiment, the first and second spring rates $S_1$, $S_2$ may be the same value. The spring rate S for a quill tube is the amount of force required to deflect (compress) the quill tube. The spring rate S for each quill tube is calculated as $S=A(E/L)$.

A is the cross-sectional area of the quill tube and is calculated as $A=(d_o)^2(\pi/4)-(d_i)^2(\pi/4)$; where $d_o$ is the outer diameter of the quill tube measured from exterior surface to exterior surface of the quill tube wall, and $d_i$ is the inner diameter of the quill tube measured from interior surface to interior surface of the quill tube wall. E is Young's modulus of elasticity for the material from which the quill tube is made (as is known in the art); and L is the length of the quill tube.

The first member 110 may include an adapter 140 and a manifold 142 adjacent to the adapter 140. The manifold 142 may be fixedly or removably secured to the adapter 140 in any of variety of ways known in the art. In one embodiment, a plurality of bolts 144 may be used to secure the manifold 142 to the adapter 140. The bolts 144 may extend through the entire length of the manifold 142 and into the adapter 140. In other embodiments, other means to fixedly or removably secure the manifold 142 to the adapter 140 may be used or, alternatively, the manifold 142 and the adapter 140 may be integral.

The adapter 140 may define an axial bore 146 configured to receive the outer quill tube 106 and the nested inner quill tube 108. As best illustrated in FIGS. 4-5, the adapter 140 may further include an exterior shoulder 148 on which a collar 150 may be disposed.

The manifold 142 may define a recess 154 positioned over the axial bore 146 of the adapter 140. FIG. 5 illustrates the recess 154 and its position relative to the axial bore 146. FIG. 6 provides an enlarged detail view of the recess 154 and the first ends 112, 124 of the inner and outer quill tubes 106, 108. The recess 154 may have a sealing surface 156 configured for sealing engagement with the first end 112 of the outer quill tube 106 and the first end 124 of the inner quill tube 108. More specifically, the sealing surface 156 may include a first recess sealing surface 158 (portion) configured for sealing engagement with the first outer sealing surface 118 of the outer tube wall 116 (of the outer quill tube 106) and a second recess sealing surface 160 (portion) configured for sealing engagement with the first inner sealing surface 130 of the inner tube wall 128 (of the inner quill tube 108). The recess 154 may be conical shaped, torus shaped, cube shaped, or any other appropriate shape for sealing engagement with the first ends 112, 124 of the outer and inner quill tubes 106, 108.

The first recess sealing surface 158 may be configured to apply a first recess contact force to the first end 112 of the outer quill tube 106 and the second recess sealing surface 160 may be configured to apply a second recess contact force to the first end 124 of the inner quill tube 108. The first ends 112, 124 of each of the outer and inner quill tubes 106, 108 being disposed proximal to each other in the recess 154. As shown in FIG. 1, when the manifold 142 is in sealing engagement with the outer and inner quill tubes 106, 108, an outer fluid passage 162 is formed between the interior surface 123 of the outer quill tube 106 and the exterior surface 134 of the inner tube wall 128 (of the inner quill tube 108).

Figure 9:
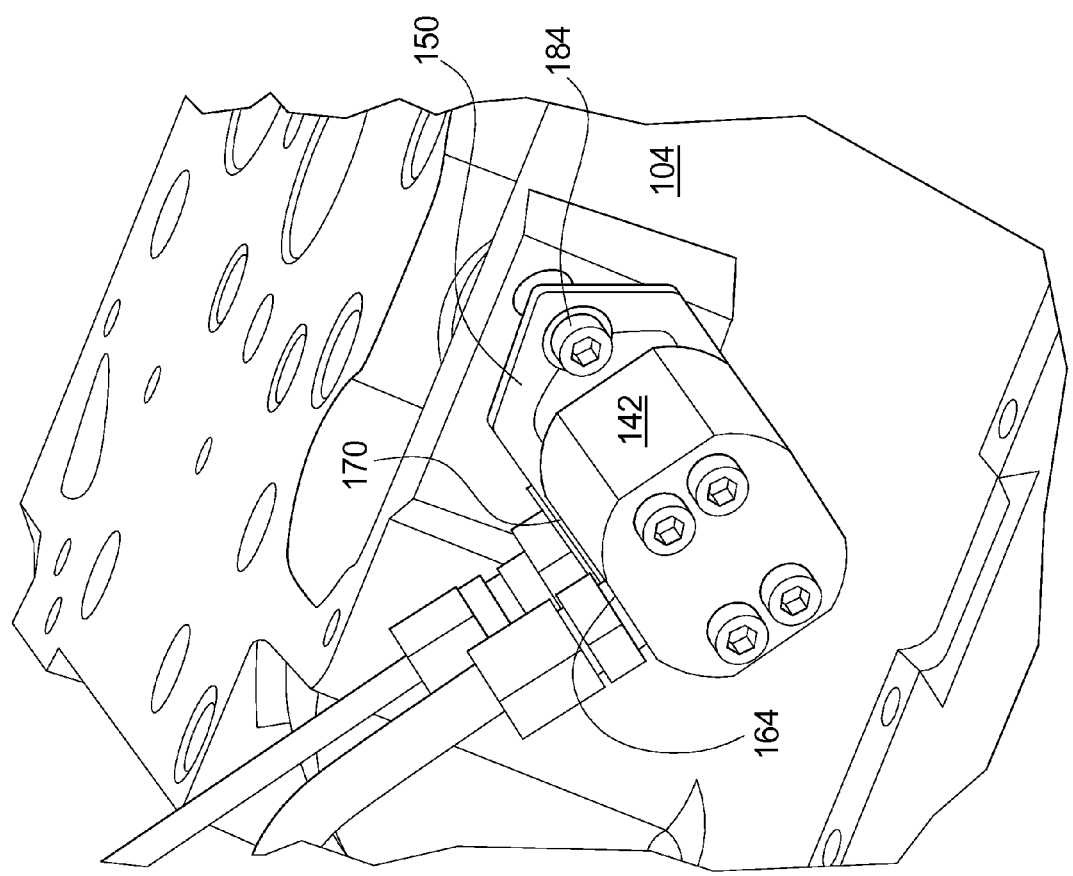
FIG. 9 is a perspective view of the duel fuel quill assembly with fuel lines attached to each inlet port.

As illustrated in FIGS. 4-6, the manifold 142 may further define a first inlet port 164, a first manifold flowpath 166, and at least one outer port 168. The first inlet port 164 extends through the outside surface of the manifold 142 and receives a first fuel. FIG. 9 illustrates an exemplary duel fuel quill assembly 100 with fuel lines attached to the inlet ports 164, 170 of the manifold 142. The outer port (or ports) 164 extends (extend) through the sealing surface 156 of the recess 154. The outer port (or ports) 164 connect(s) the first manifold flowpath 166 with the outer fluid passageway 162 and is (are) disposed in the sealing surface 156 of the recess 154 between the first and second sealing surfaces 158, 160.

The manifold 142 may further define a second inlet port 170, a second manifold flowpath 172, and an inner port 174. The second inlet port 170 extends through an outside surface of the manifold 142 and receives a second fuel. The inner port 174 extends through the sealing surface 156 of the recess 154. The inner port 174 connects the second flowpath 172 with the inner fluid passageway 138 and is disposed in the sealing surface 156 of the recess 154. In one embodiment, the second recess sealing surface 160 generally surrounds the inner port 174.

The dual quill feed 102 is mounted on the cylinder head 104 of the engine 200. The cylinder head 104 may define a main bore 176 and a cavity 178 (FIG. 1). The main bore 176 has a first 180 and a second end 182 and is configured to receive the adapter 140 and the outer and inner quill tubes 106, 108.

The dual quill feed 102 may be mounted on the cylinder head 104 adjacent to the first end 180 of the main bore 176. A securing member 184 may extend through the collar 150 of the adapter 140 and into the cylinder head 104 in which the adapter 140 is disposed. The adapter 140 of the dual quill feed 102 may be disposed at least partially in the main bore 176. The cavity 178 may be adjacent to the second end 182 of the main bore 176 and may be configured to receive and sealingly engage the second ends 114, 126 of the first and second quill tubes 106, 108.

The adapter 140 is moveable between an open and a closed position in the cylinder head 104. FIG. 7 illustrates the adapter 140 in the open position where sealing engagement has not yet been established between the recess 154 and the sealing surfaces 118, 130 of the outer and inner tube walls 116, 128 and between the cavity 178 and the sealing surfaces 120, 132 of the outer and inner tube walls 116, 128. Whereas, FIG. 1 illustrates the adapter 140 in the closed position where sealing engagement has been established between the recess 154 and the sealing surfaces 118, 130 of the outer and inner tube walls 116, 128 and between the cavity 178 and the sealing surfaces 120, 132 of the outer and inner tube walls 116, 128.

Figure 8:
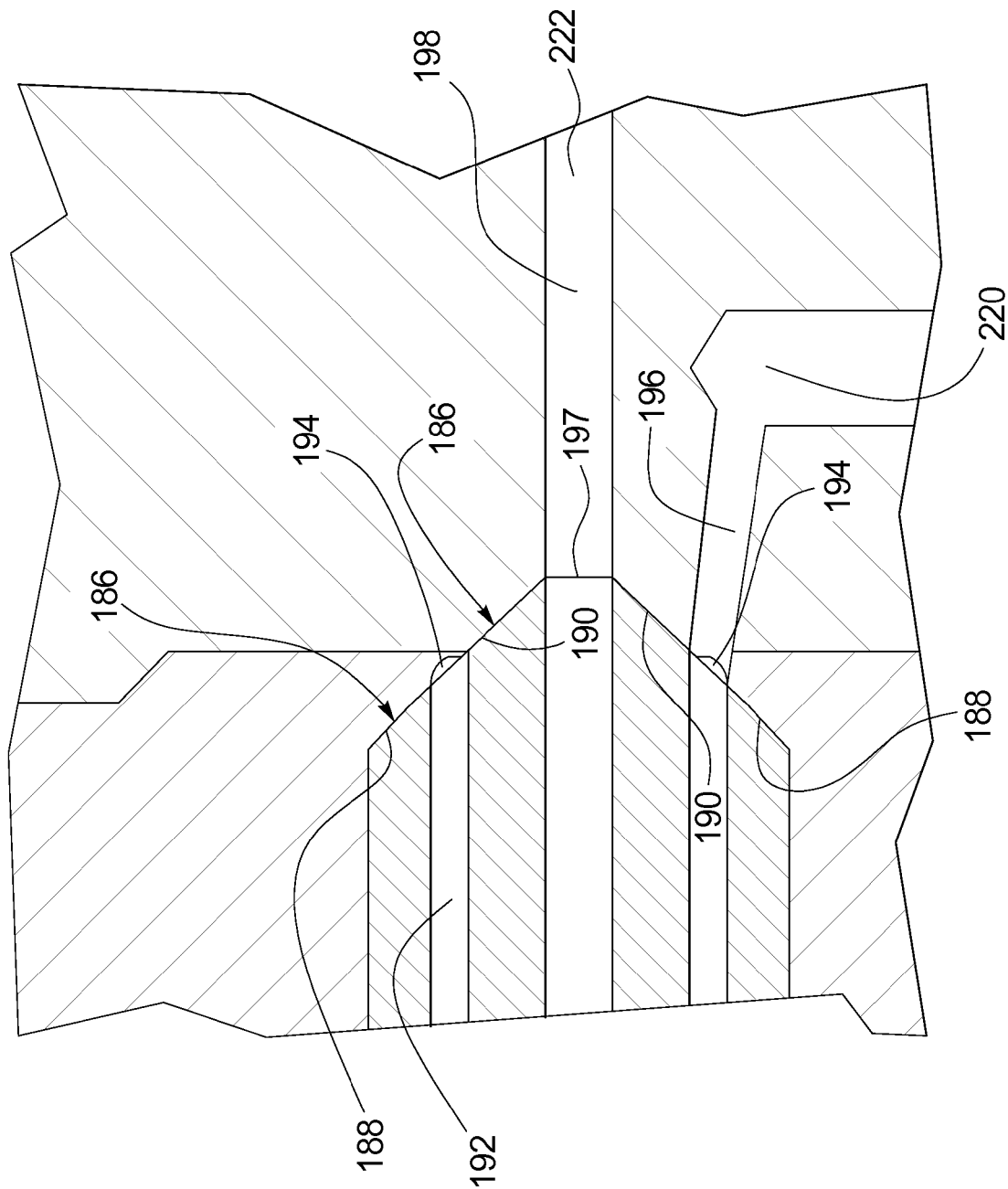
FIG. 8 is a sectional view of the second ends of the inner and outer quill tubes in sealing contact with the sealing surfaces of the cylinder head cavity when the first member is in the closed position.

FIG. 8 illustrates an enlarged view of cylinder head cavity 178 and the second ends 114, 126 of the outer and inner quill tubes 106, 108. The cavity 178 may have a cavity sealing surface 186 configured for sealing engagement with the second end 114 of the outer quill tube 106 and the second end 126 of the inner quill tube 108. More specifically, the cavity sealing surface 186 may include a first cavity sealing surface 188 (portion) configured for sealing engagement with the second outer sealing surface 120 of the outer tube wall 116 (of the outer quill tube 106) and a second cavity sealing surface 190 (portion) configured for sealing engagement with the second inner sealing surface 132 of the inner tube wall 128 (of the inner quill tube 108). The cavity 178 may be conical shaped, torus shaped, cube shaped, or any other appropriate shape for sealing engagement with the second ends 114, 126 of the outer and inner quill tubes 106, 108.

The first cavity sealing surface 188 may be configured to apply a first cavity contact force to the second end 114 of the outer quill tube 106 and the second cavity sealing surface 190 may be configured to apply a second cavity contact force to the second end 126 of the inner quill tube 108. The second ends 114, 126 of each of the outer and inner quill tubes 106, 108 are disposed proximal to each other in the cavity 178. When the recess 154 of the manifold 142 and the cavity 178 of the cylinder head 104 are in sealing engagement with the outer and inner quill tubes 106, 108, the outer fluid passage 192 is formed between the interior surface 123 of the outer quill tube 106 and the exterior surface 134 of the inner tube wall 128 (of the inner quill tube 108).

The cylinder head 104 may further define at least one exit port 194 and a first injector flowpath 196. The exit port (or ports) 194 extend(s) through the cavity sealing surface 186. The first injector flowpath 196 extends from the exit port (or ports) 194 through the cylinder head 104 to the combustion chamber (not shown) of the engine. The exit port (or ports) 194 connect(s) the outer fluid passageway 192 with the first injector flowpath 196 and is(are) disposed in the sealing surface 186 of the cavity 178 between the first and second cavity sealing surfaces 186, 188.

The cylinder head 104 may further define an outlet port 197 and a second injector flowpath 198. The outlet port 197 extends through the sealing surface 186 of the cavity 178. The outlet port 197 connects the second injector flowpath 198 with the inner fluid passageway 138. In one embodiment, the second cavity sealing surface 190 generally surrounds the outlet port 197.

As best seen in FIG. 1, a first fuel flow path 220 is defined by the dual fuel quill assembly 100 and comprises the first manifold flowpath 166, the outer port (or ports) 168, the outer fluid passageway 192, the exit port (or ports) 194 and the first injector flowpath 196. A second fuel flow path 222 is defined by the dual fuel quill assembly 100 and comprises the second manifold flowpath 172, the inner port 174, the inner fluid passageway 138, the outlet port 197 and the second injector flowpath 198.

A method of assembling the dual fuel quill assembly 100 for the engine 200 is also disclosed. The method comprises providing the outer quill tube 106, the inner quill tube 108, the adapter 140, the manifold 142, and the cylinder head 104. The method further comprises nesting the inner quill tube 108 in the outer quill tube 106 and positioning the outer and inner quill tubes 106, 108 in the main bore 176 of the cylinder head 104 such that the second ends 114, 126 of the outer and inner quill tubes 106, 108 are received into the cavity 178 disposed adjacent to the second end 182 of the main bore 176 of the cylinder head 104.

The method further comprises sliding the outer and inner quill tubes 106, 108 into the axial bore 146, and generating a first recess sealing contact force between the recess 154 and the first outer sealing surface 118 of the outer quill tube 106 when the adapter 140 is secured to the cylinder head 142, and generating a second recess sealing contact force between the recess 154 and first inner sealing surface 130 of the inner quill tube 108 when the adapter 140 is secured to the cylinder head 142. The first recess sealing contact force generated may be a different value than the second recess sealing contact force generated. The sealing contact force is the force between the end of the quill tube and the sealing surface which it engages. For example, the first sealing contact force is the force between the first outer sealing surface 118 (of the outer quill tube 106) and the first recess sealing surface 158 of the recess 154. Sealing contact forces retard or prevent fuel from leaking between the manifold 142 recess 154 and the first ends 112, 124 of the quill tubes 106, 108 and the second ends 114, 126 quill tubes 106, 108 and the cylinder head 104 cavity 178.

According to the method, a first cavity sealing contact force may be generated between the cavity 178 and the second outer sealing surface 120 of the outer quill tube 106 when the adapter 140 is secured to the cylinder head 104, and a second cavity sealing contact force may be generated between the cavity 178 and the second inner sealing surface 132 of the inner quill tube 108 when the adapter 140 is secured to the cylinder head 104. The first and second cavity sealing contact forces may be different values.

INDUSTRIAL APPLICABILITY

In a duel fuel engine, two different types of fuel are fed from fuel lines to the combustion chamber of an engine. In the present disclosure, a duel quill arrangement is utilized where a first fuel may flow in the outer quill tube and a second fuel may flow in the inner quill tube that is nested within the outer quill tube. Each juncture (at the first and second ends of the quill tubes) where fuel enters or exits the quill tubes must be sealed with enough sealing contact force to retard or prevent leaking. Moreover, each such juncture for the first fuel may require a sealing contact force of a different value than each such juncture for the second fuel. The present disclosure may find applicability in providing a design that receives and provides two different fuels to an engine and distributes the appropriate sealing contact forces to the junctures at the first and second ends of the outer and inner quill tubes in order to inhibit or prevent leaking of the fuels.

As the adapter portion of the first member is secured to the cylinder head, the adapter moves from the open position to the closed position. In one embodiment, the securing member, by which the first member is secured to the cylinder head, is a plurality of bolts. The bolts extend through the collar disposed on the shoulder of the adapter and screw into the cylinder head. The bolts are screwed into the cylinder head until the adapter has moved from the open position to closed position. In the closed position, sealing engagement is established and fuel is inhibited or prevented from leaking at the junctures discussed above.

One example of the progression of sealing engagement between the recess and the sealing surfaces of the outer and inner tube walls, and between the cavity and the sealing surfaces of the outer and inner tube walls as the adapter is moved from the open to the closed position is discussed below. In the embodiment discussed below, the recess and cavity are generally conical shaped and the inner quill tube is longer than the outer quill tube. Other progressions are possible depending on geometries for the recess and cavity, and the relative lengths and spring rates of the quill tubes.

In an embodiment, as the first member is secured to the cylinder head (in this embodiment, as the bolts are tightened) and the adapter begins to move from the open position to the closed position, the first recess sealing surface and first cavity sealing surface may make initial contact with the first and second outer sealing surfaces of the outer quill tube and the first and second ends of the outer quill tube may begin to be compressed against the first sealing surfaces of the recess and cavity. Because of the conical geometry of the recess and cavity (in this embodiment) and the differing lengths of the quill tubes, the first and second inner sealing surfaces are not yet compressed/deflected by the second sealing surfaces of the recess and cavity. The continued tightening of the bolts moves the adapter toward the second position and further force is applied to the outer sealing surfaces of the outer quill tube by the first sealing surfaces of the recess and cavity. The second sealing surfaces of the recess and cavity begin to compress the inner sealing surfaces of the first and second ends of the inner quill tube. When the adapter is in the second position, the first and second ends of both the outer and inner quill tubes are compressed and sealing contact forces are established between the sealing surfaces of the first and second ends of the outer and inner quill tubes and the sealing surfaces of the recess and cavity, respectively.

The first and second recess sealing contact forces and the first and second cavity sealing contact forces may be unequal, or may be the same depending on the selected geometry of the recess and cavity, the relative length of the quill tubes, and the spring rate of each quill tube. The disclosed method is not limited to the sealing surfaces of the outer quill tube contacting the sealing surfaces of the cavity and recess before the sealing surfaces of the inner quill contact the sealing surfaces of the cavity and recess. In other embodiments, the inner quill may contact the sealing surfaces prior to the outer quill tube or at the same time.

In operation, a first fuel flows through the first inlet port from a fuel line into the first fuel flowpath and to the combustion chamber of the engine. A second fuel flows through the second inlet port from a fuel line and into the second fuel flowpath to the combustion engine. The second fuel may be provided in a smaller volume than the first fuel and may aid ignition of the first fuel.

The features disclosed herein may be particularly beneficial to a stand alone engine or an engine used in an earth moving, construction, or mining vehicle where two fuels are provided to the combustion chamber of the engine.

What is claimed is:

1. A dual fluid quill assembly comprising:
a first quill tube of a first length;
a second quill tube of a second length, the second quill tube nested within the first quill tube, wherein the second length is different than the first length;
an adapter defining an axial bore configured to receive the first quill tube and the nested second quill tube; and
a manifold adjacent to the adapter, the manifold including a sealing surface sealingly engaged with a first end of the first quill tube and a first end of the second quill tube, the sealing surface applying a first sealing contact force to the first end of the first quill tube and a second sealing contact force to a first end of the second quill tube, wherein the first sealing contact force is different than the second sealing contact force.

2. The quill assembly of claim 1, wherein the second length is longer than the first length.

3. The quill assembly of claim 2, wherein a difference between the first length and the second length is about 0.202 millimeters to about 0.302 millimeters.

4. The quill assembly of claim 2, wherein the first end of the second quill tube protrudes from the first end of the first quill tube about 0.101 millimeters to about 0.151 millimeters.

5. The quill assembly of claim 1, in which the first quill tube includes an outer sealing surface disposed at the first end of the first quill tube, the second quill tube includes an inner sealing surface disposed at the first end of the second quill tube, and the manifold sealing surface includes a first recess sealing surface configured to receive the outer sealing surface and a second recess sealing surface disposed proximal to the first recess sealing surface and configured to receive the inner sealing surface.

6. The quill assembly of claim 1, wherein the first quill tube has a first spring rate and the second quill tube has a second spring rate that is different than the first spring rate.

7. The quill assembly of claim 6, wherein the first sealing contact force is greater than the second sealing contact force.

8. A dual fuel quill assembly for an engine, the dual fuel quill assembly comprising:
- a cylinder head including a main bore and a receiving cavity;
- an outer quill tube of a first length;
- an inner quill tube nested within the outer quill tube and having a second length that is different than the first length;
- an adapter slidingly received inside the main bore of the cylinder head, the adapter moveable between a first position and a second position and defining an axial bore configured to receive the outer quill tube and the nested inner quill tube; and
- a manifold secured to the adapter, the manifold defining a recess compressing the outer and inner quill tubes against the cylinder head cavity when the adapter is in the second position, the recess of the manifold applying a first recess sealing contact force to a first end of the outer quill tube, and a second recess sealing contact force to a first end of the inner quill tube, the first recess sealing contact force being different than the second recess sealing contact force.

9. The dual fuel quill assembly of claim 8, further including a collar disposed on the adapter and a securing member that extends through the collar and into the cylinder head.

10. The dual fuel quill assembly of claim 8, in which the outer quill tube comprises a generally cylindrical wall of substantially uniform thickness.

11. The dual fuel quill assembly of claim 8, wherein the recess is generally conical shaped.

12. The dual fuel quill assembly of claim 8, wherein the manifold is external to the cylinder head.

13. The dual fuel quill assembly of claim 8, outer quill tube outer quill tube has a first spring rate and the inner quill tube has a second spring rate that is different from the first spring rate.

14. The dual fuel quill assembly of claim 8, wherein further the second recess sealing contact force is less than the first recess sealing contact force.

15. The dual fuel quill assembly of claim 8, wherein the inner quill is longer than the outer quill.

16. A method of assembling a dual fuel quill assembly for an engine, the method comprising:
- providing an outer quill tube having a first spring rate and a first length, an inner quill tube having a second spring rate and a second length, the inner quill tube nested in the outer quill tube, an adapter defining an axial bore, a manifold attached to the adapter and defining a recess, and a cylinder head defining a main bore;
- positioning the outer and inner quill tubes in the main bore of the cylinder head;
- sliding the outer and inner quill tubes into the adapter axial bore;
- generating a first recess sealing contact force between the recess and the outer quill tube when the adapter is secured to the cylinder head; and
- generating a second recess sealing contact force between the recess and the inner quill tube when the adapter is secured to the cylinder head, wherein the first recess sealing contact force generated is different than the second recess sealing contact force generated.

17. The method of claim 16, wherein the first spring rate is different than the second spring rate.

18. The method of claim 16, wherein the first length is different than the second length.

19. The method of claim 16, wherein the first spring rate is different than the second spring rate, and the first length is different than the second length.

20. The method of claim 16, wherein the cylinder head includes a receiving cavity disposed adjacent to an end of the main bore, and the method further comprises generating a first cavity sealing contact force between the cavity and the outer quill tube when the adapter is secured to the cylinder head; and generating a second cavity sealing contact force between the cavity and the inner quill tube when the adapter is secured to the cylinder head.

* * * * *